United States Patent [19]

Pernick

[11] Patent Number: 4,810,047
[45] Date of Patent: Mar. 7, 1989

[54] IN-LINE HOLOGRAPHIC LENS ARRANGEMENT

[75] Inventor: Benjamin J. Pernick, Forest Hills, N.Y.

[73] Assignee: Grumman Aerospace Corporation, Bethpage, N.Y.

[21] Appl. No.: 156,333

[22] Filed: Feb. 16, 1988

[51] Int. Cl.$^4$ .................. G02B 5/32; G02B 27/28; G02B 27/46

[52] U.S. Cl. .................. 350/3.72; 350/3.73; 350/162.12; 350/400

[58] Field of Search ............. 350/3.72, 3.73, 162.12, 350/400

[56] References Cited

U.S. PATENT DOCUMENTS 4,312,559  1/1982  Kojima et al. .................. 350/3.75 X
4,586,780  5/1986  Chern et al. .................. 350/3.7

Primary Examiner—John K. Corbin
Assistant Examiner—David J. Edmondson
Attorney, Agent, or Firm—Scully, Scott, Murphy & Presser

[57] ABSTRACT

An optical system for an in-line holographic lens or lens array which is designed to produce and pass a symmetrical focused beam of light while or blocking or attenuating the zero order in-line collimated beam illuminating and passed by the lens. Each holographic lens is designed to produce a symmetrical focused beam of light, and has particular applicability to high quality, low f-number holographic lenses. In the optical system, the in-line holographic lens is illuminated by a reconstruction beam of light such that it produces a focused beam of light along the optical axis of the lens, and also passes the zero order in-line reconstruction beam. A polarization rotator is positioned along the optical axis to receive the focused beam of light and also the zero order reconstruction beam, with the focused beam of light being incident thereon and traversing through the polarization rotator at different angles from the zero order reconstruction beam. This results in the zero order reconstruction beam being rotated in polarization differently from the focused beam of light. A polarization filter is positioned along the optical axis to receive the light output of the polarization rotator, and has the polarization angle thereof positioned substantially at the polarization angles of the focused beam, such that it substantially passes the focused beam of radiation and substantially attenuates the zero order reconstruction beam.

5 Claims, 4 Drawing Sheets

RECORDING GEOMETRY FOR AN
IN-LINE HOLOGRAPHIC LENS

RECORDING GEOMETRY FOR AN
IN-LINE HOLOGRAPHIC LENS

IN-LINE HOLOGRAPHIC LENS ARRANGEMENT

BACKGROUND OF THE INVENTION

1. Field of the Invention

The present invention relates generally to an in-line holographic lens arrangement which is particularly designed to produce and pass a symmetrical focused beam of light while blocking or attenuating the zero order, in-line collimated beam illuminating the lens. The subject invention is particularly applicable to high quality, low f-number holographic lenses.

2. Discussion of the Prior Art

Holographic lenses and multiple holographic lenses are well known in the art, and one particular application thereof, which is relevant to the present invention, is in the field of optical correlators.

In greater particularity, in such optical correlators an input image is correlated with optical information stored in a matched filter or multiple matched filters to provide identification and aspect information about the input image. In one particular design, an input image is directed onto a spatial light modulator to spatially modulate a coherent beam of radiation. The spatially modulated radiation beam is directed onto a multiple holographic lens which performs a multiple number of Fourier transformations thereon to obtain an array of a multiple set of Fourier transforms of the spatially modulated radiation beam. A corresponding array of matched filters has the array of Fourier transforms incident thereon, with each matched filter comprising a Fourier transform hologram of an aspect view of an object of interest. Each matched filter passes an optical correlation signal in dependence upon the degree of correlation of the Fourier transform of the spatially modulated radiation beam with the Fourier transform hologram recorded thereon. An inverse Fourier transform lens receives the optical correlation outputs of the array of matched filters, and performs an inverse Fourier transformation on each optical correlation output, which is directed to an output correlation plane. A detector at the output correlation plane then detects the optical correlation output, and produces a detector output signal representative thereof. A processing circuit compares the relative magnitudes of the signals to determine identification and aspect information about the input image.

A simpler form of such an optical correlator would utilize a single Fourier transform holographic lens and a single matched filter. Moreover, such optical correlators can employ off-line multiple holographic lenses, or in-line multiple holographic lenses, and the present invention is concerned only with the latter in-line optical arrangements.

However, it should also be stressed that the teachings of the present invention have general application to in-line optical systems employing lens elements therein, and are not limited only to applications in optical correlators as described hereinabove.

Moreover, the prior art dealing with holographic lenses can be categorized into in-line and off-line holographic lenses, and the present invention is generally limited only to in-line optical systems.

Kojima, U.S. Pat. No. 4,312,559 discloses the construction of an in-line holographic lens for use with optical signal reproduction systems, (e.g., optical discs, records, etc.). The desired lens is to have a large numerical aperture.

There are several differences between the present invention and this patent. First, Kojima's method involves large angle separation between the reference and focused object beam, which serves to suppress the conjugate order in the reconstruction process. This technique is effective only for thick emulsion holograms in which the Bragg effect is responsible for the inefficient reconstruction of the undesired component beam (note that the conjugate beam is much weaker than the DC beam which interferes with the focused beam). However, because of the large angle separation between recording beams, the recorded interference pattern is very asymmetrical. This asymmetry is responsible for the poor focusing qualities of such a holographic lens. This assymetrical disadvantage is a feature that the subject invention seeks to eliminate. Furthermore, the subject invention is not restricted to thick emulsions, and any type of emulsion can be utilized.

Secondly, the reconstructed zero order DC beam and the desired focused beam overlap in the patented system, and no attempt is made to separate the two beams. This is a serious problem, particularly for optical correlator applications, since the DC beam is comparable in intensity to features in the neighborhood of the focused beam, in the matched filter plane of the optical correlator. In contrast thereto, in the subject invention a primary objective is to avoid beam overlap by eliminating the DC beam.

Also, for reconstruction in the patented system, the hologram is illuminated by the reconstruction beam on the opposite side of the plate used for the recording exposure, which results in phase distortions introduced by the glass or film substrate. The present invention does not introduce similar phase distortions.

This patent also states in column 4, line 15 et. seq. that the reconstruction beam in the system must move up and down with respect to the hololens. Since the asymetrical hologram recording is being illuminated over different portions, the resulting focused beam will suffer distortions that are not constant. In contrast thereto, the present invention does not involve relative motion of the reconstruction beam, and consequently does not introduce such distortions.

Finally, in column 4, line 25, et. seq., the Kojima patent states that the in-line lens does not require difficult initial alignment adjustments. However, in this system the alignment of the reconstruction beam must still be maintained since it must move relative to the hololens plate, which is not a constraint in the present invention.

SUMMARY OF THE INVENTION

Accordingly, it is a primary object of the present invention to provide an optical system for an in-line holographic lens which is designed to produce and pass a symmetrical focused beam of light while blocking or attenuating the zero order in-line collimated beam illuminating the lens.

A further object of the subject invention is the provision of an optical system for an in-line holographic lens which is designed to produce a symmetrical focused beam of light, and which has particular applicability to high quality, low f-number holographic lenses.

In accordance with the teachings herein, the present invention provides an optical system for producing a focused beam of light, focused by an in-line holographic lens while substantially blocking or attenuating the zero order reconstruction beam passing through the in-line holographic lens. The in-line holographic lens is illuminated by a reconstruction beam of light such that it produces a focused beam of light along the optical axis of the lens, and also passes therethrough the zero order in-line reconstruction beam.

A polarization rotator is positioned along the optical axis of the holographic lens to receive the focused beam of light and also the zero order reconstruction beam, with the focused beam of light being incident thereon and traversing through the polarization rotator at different angles from the zero order reconstruction beam. This results in the zero order reconstruction beam being rotated in polarization differently from the focused beam of light.

A polarization analyzer or filter is positioned along the optical axis to receive the light output of the polarization rotator, and has the polarization angle thereof positioned substantially at the polarization angles of the focused beam, such that it substantially passes the focused beam of radiation and substantially blocks the zero order reconstruction beam.

In greater particularity, the in-line holographic lens comprises a recording of a regular symmetrical fringe pattern produced by illuminating a photo recording medium forming the holographic lens with a reference beam of radiation and simultaneously with an expanding beam of radiation from a point source, or with a converging beam of radiation. The light in the expanding or converging beam is expanding or converging symmetrically about the optical axis of the holographic lens formed thereby, which produces a regular symmetrical fringe pattern on the recording medium. When the resultant holographic lens is illuminated with a reconstruction beam along the optical axis thereof, it produces a focused beam of light having a symmetrical distribution of light around the optical axis.

In some advantageous embodiments the point source is relatively close to the holographic lens during the production thereof, to illuminate the holographic lens with a rapidly expanding curved wavefront. This arrangement produces a low f-number holographic lens, such that the angles of incidence of the focused beam of light on the polarization rotator are substantially different from the angle of incidence of the collimated reference beam thereon, which allows relatively easy polarization discrimination therebetween.

In several various embodiments, the in-line holographic lens discussed hereinabove is one lens of a multiple holographic lens element, and the reconstruction beam directs light to simultaneously illuminate all of the holographic lenses of the multiple holographic lens, and the polarization rotator and polarization filter are positioned to receive the outputs from all of the holographic lenses of the multiple holographic lens element.

BRIEF DESCRIPTION OF THE DRAWINGS

The foregoing objects and advantages of the present invention for an in-line holographic lens arrangement may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
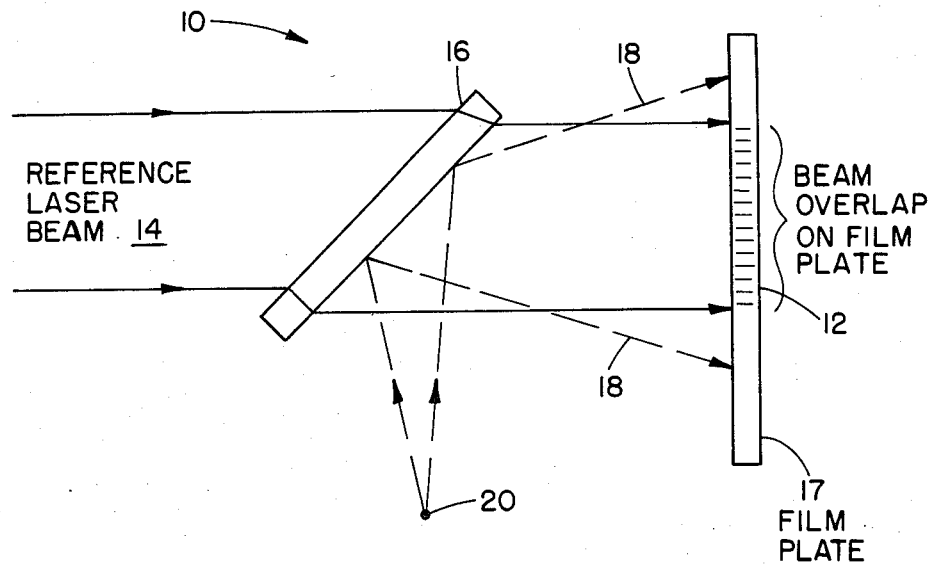
FIG. 1 illustrates one suitable optical arrangement for fabricating an in-line holographic lens with a symmetrically diverging light beam to produce a regular symmetrical fringe pattern thereon, such that when the holographic lens is illuminated with a reconstruction beam, it produces a focused beam of light having a symmetrical distribution of light around the optical axis.

Referring to the drawings in detail, FIG. 1 illustrates one suitable optical arrangement 10 for fabricating an in-line holographic lens to produce a regular symmetrical fringe pattern 12 thereon, such that when the holographic lens is illuminated with a reconstruction beam, it produces a focused beam of light having a symmetrical distribution of light around the optical axis thereof.

In this arrangement, a reference laser beam 14 passes through a beam splitter 16, and is incident as a plane wave upon a photo recording medium such as a film plate 17 for fabricating and recording the in-line holographic lens. Simultaneously therewith a spherical wave 18 emanating from a point source 20 or its equivalent is also reflected by the beam splitter 16 onto the photo recording medium.

An interference pattern is formed by the spherical wave 18 and the plane wave 14, and is recorded on the film plate. In this schematic arrangement, the reference laser beam is normal to the film plate, and the expanding spherical wave is centered with respect to the collimated beam. Both beams are similarly polarized, and a holographic recording is made with the two superposed beams.

Figure 2:
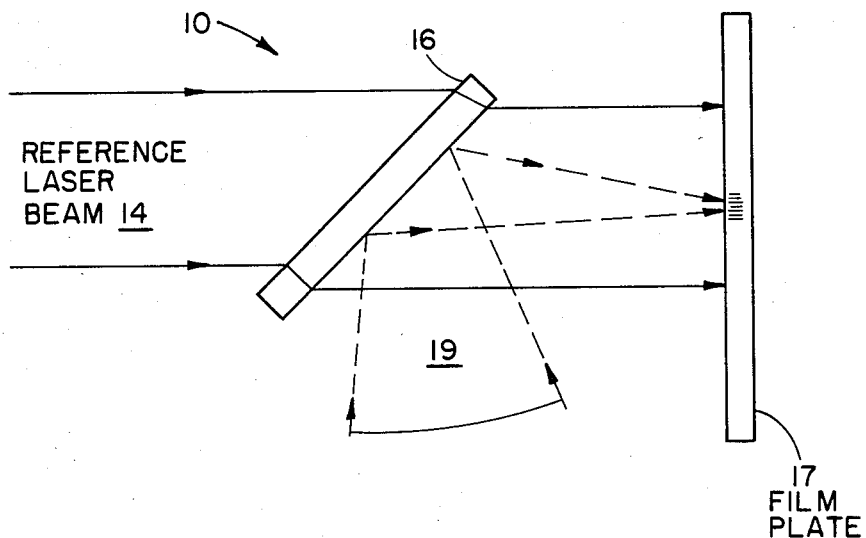
FIG. 2 illustrates a second optical arrangement for fabricating an in-line holographic lens with a symmetrically converging light beam to produce a regular symmetrical fringe pattern thereon, such that when the holographic lens is illuminated with a reconstruction beam, it produces a focused beam of light having a symmetrical distribution of light around the optical axis.

FIG. 2 illustrates a second optical arrangement similar to that of FIG. 1 for fabricating an in-line holographic lens but utilizing a symmetrical converging spherical light beam 19 to produce a regular symmetrical fringe pattern thereon, such that when the holographic lens is illuminated with a reconstruction beam, it produces a focused beam of light having a symmetrical distribution of light around the optical axis.

The arrangements of FIGS. 1 and 2 possess a significant advantage relative to many existing prior-art arrangements for generating holographic lens elements, particularly off-axis holographic lens elements. The holographic recording consists of a regular, symmetrical fringe pattern that can be centered on the recording medium. Thus, if the reconstruction beam illuminates the central region of this symmetrical fringe pattern, the resulting focused beam of light distribution will also be symmetrical, which can be shown experimentally by observation of the focused beam Airy pattern.

Figure 3:
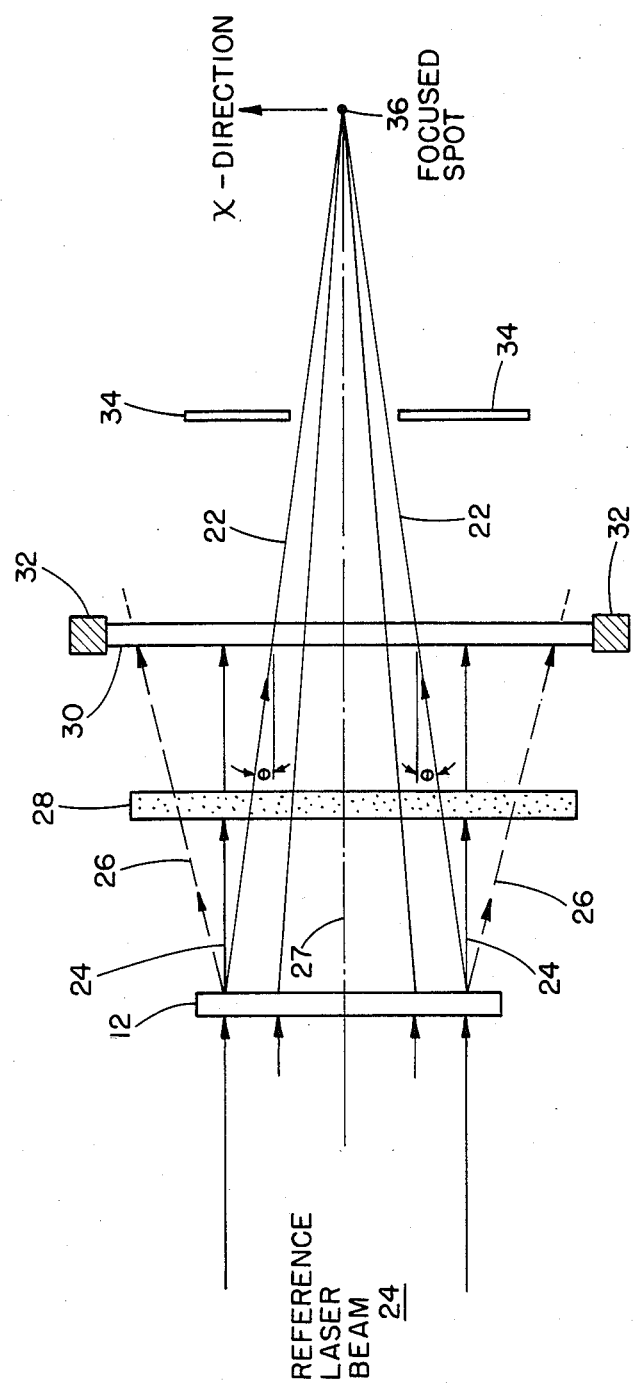
FIG. 3 illustrates an optical arrangement for producing a focused beam of light, focused by an in-line holographic lens as produced in FIG. 1, while substantially blocking or attenuating the zero order reconstruction beam illuminating the holographic lens.

FIG. 3 illustrates an optical arrangement for producing a focused beam of light 22, focused by an in-line holographic lens 12, as produced in FIG. 1, while substantially blocking or attenuating the zero order reconstruction beam 24 illuminating the holographic lens. In this arrangement, a collimated linearly polarized laser reconstruction beam 24 is incident normal to the holographic lens 12 along its optical axis. The holographic lens produces the focused beam of light 22, reproducing in effect the conjugate or real image of the spherical beam 18, and also passes a substantial portion 24 of the in-line zero order reconstruction beam. A diverging spherical beam 26 emanating from a virtual image is also produced. All three beams 22, 24 and 26 are incident upon a polarization rotator 28 positioned along the optical axis to receive the light output of the in-line holographic lens. As illustrated by the geometry, the focused beam of light 22 is incident upon and traverses through the polarization rotator 28 at different angles from the zero order reconstruction beam 24, with the result that the zero order reconstruction beam is rotated in polarization differently from the focused beam of light.

The actual magnitudes of the angles of polarization rotation will depend upon several factors including the geometry of the arrangement, the material (such as quartz) and thickness of the polarization rotator, and the wavelengths of the beams, and can vary from embodiment to embodiment. The salient feature is that the two beams are rotated in polarization by different angles, e.g. 90° apart, such that the different angular states of polarization can be discriminated against by a polarization analyzer or filter 30 which is angularly positioned with the polarization angle thereof substantially at the polarization angles of the focused beam to substantially pass the focused beam of radiation and substantially block or attenuate the zero order reconstruction beam.

Reference is specifically made to the polarization angles of the focused beam as the outer radial portions thereof are incident upon and traverse the polarization rotator at greater angles of incidence, while the inner portions thereof traverse the polarization rotator at lesser angles of incidence, and the portion thereof along the optical axis 27 traverses the polarization rotator at the same angle of incidence as the collimated laser beam. In summary, the light in the focused converging beam is also affected by the polarization rotator. However, the path length through the rotator is not a constant quantity for this wavefront as it is for the collimated reconstruction beam. It depends upon the particular ray geometry, specifically, it depends upon the ray angle of incidence $\theta$. By suitable choice of thickness of the polarization rotator and the optical rotary power thereof, the amount of polarization rotation can be made to change rapidly with change in angle $\theta$.

By appropriately setting the angle of polarization of the polarization analyzer or filter 30 near the polarization angles of the outer portions of the focused beam, the zero order reconstruction beam can be effectively discriminated against and blocked by the polarization filter 30. In some embodiments, the polarization filter can be angularly adjustably mounted in a frame 32 to pass greater or lesser amounts of both the focused beam 22 and the zero order reconstruction beam 24.

The diverging spherical wave 26 is generally not of interest, and is diverging away from the focused beam of interest. Even though the expanding spherical wave 26 from the hololens will be subject to polarization rotation as well, it will not be completely blocked by the analyzer. However, the relative intensity would be very low compared to the focused beam and, in effect, a weak, near constant light level in the neighborhood of the intense focused spot. Thus, its presence can be effectively neglected. However, both the diverging spherical beam 26 and some passed portions of the zero order reconstruction beam can be further discriminated against by an aperture stop 34.

It should be noted that as a consequence of the symmetry of the optical arrangements disclosed herein, the area of the holographic lens illuminated by the reconstruction beam can be made relatively large compared to the distance from the holographic plate to the focused spot, the so-called focal length of the hololens. In other words, a high quality, low f-number lens can be generated holographically. In these arrangements, the point source or equivalent 20 in FIG. 1 would be positioned to be relatively close to the holographic lens during the production thereof, to illuminate the holographic lens with a rapidly expanding curved wavefront, thereby producing a low f-number holographic lens. Moreover, with such a low f-number holographic lens, in the reconstruction arrangement of FIG. 3, the angles of incidence of the focused beam of light on the polarization rotator would be substantially different from the angle of incidence of the collimated reference beam thereon, thereby providing very effective polarization discrimination.

Figure 4:
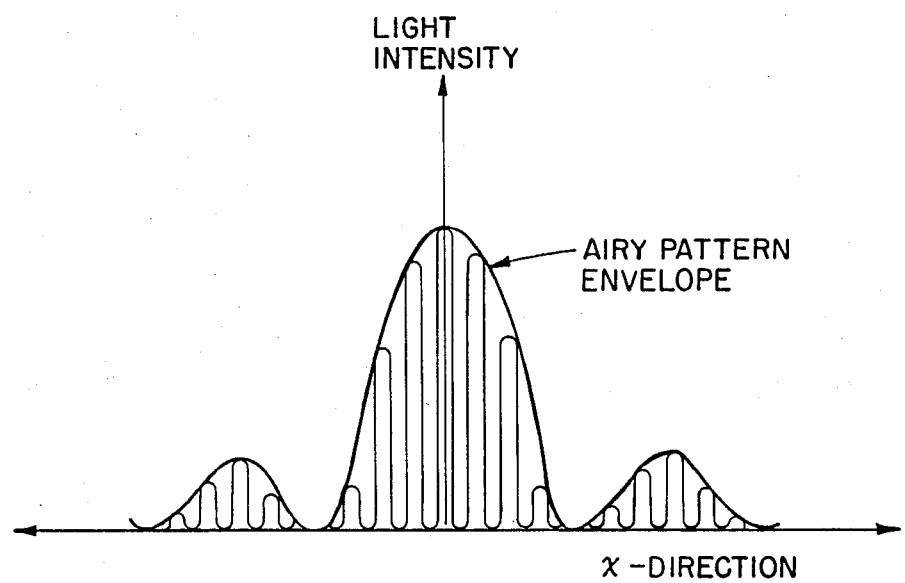
FIG. 4 is a profile of the light intensity of the focused spot of light formed by the optical arrangement of FIG. 3.

The light intensity profile of the focused spot 36 is presented schematically in FIG. 4. The fringe-like structure is a consequence of the varying rotation of the polarization direction in the converging beam. With no polarization effects, the focused spot distribution would be ideally that of an Airy pattern. If the fringe spacing is very small, then the effective light distribution would be given by the envelope, the desired Airy pattern (a large fringe density would be obtained with a large optical rotary power for a given rotator thickness).

Figure 5:
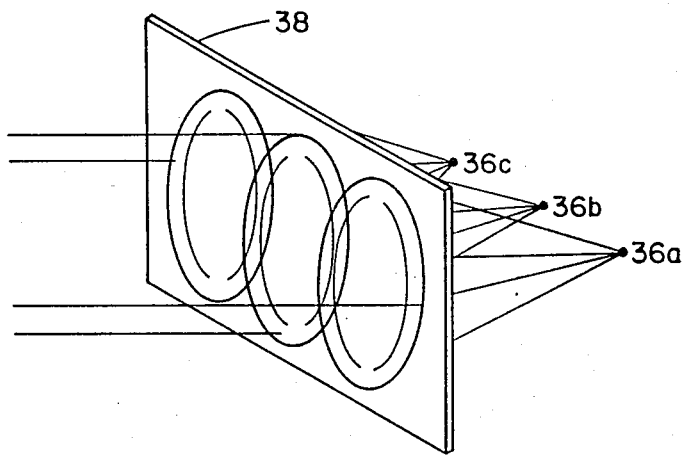
FIG. 5 illustrates a simple multiple holographic lens which can also be fabricated using the basic optical arrangements disclosed herein.
Figure 6:
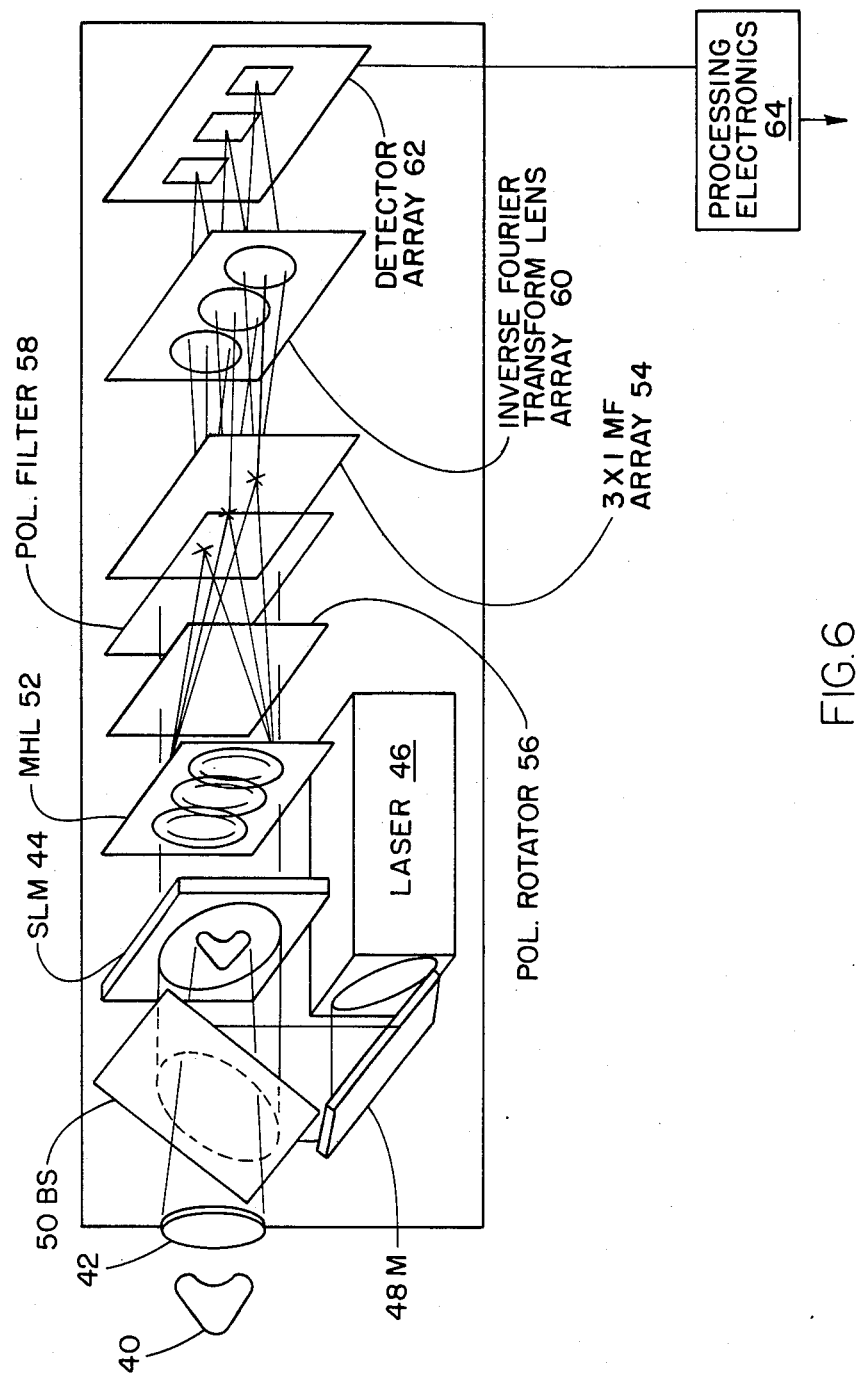
FIG. 6 illustrates a relatively simple optical correlator employing therein a multiple holographic lens as in FIG. 5 arranged and utilized pursuant to the teachings of the present invention.

FIG. 5 illustrates a simple multiple holographic lens (3×1 array) 38 which can be fabricated using the basic optical arrangement of FIG. 1, and which produces three focal points of radiation 36a, 36b, and 36c. The 3×1 array is exemplary only, and other numbers and configurations of arrays are also possible herein. It should be noted that the illustration of each lens therein is very schematic and would not have a similar appearance in a real holographic lens. An array of such hololenses as illustrated in FIG. 5 can be constructed by displacement or offset of the spherical-like recording beam with respect to the hologram plate. For example, a simple step and repeat method can be effectively utilized FIG. 6 is a schematic arrangement of a relatively simple optical correlator employing a multiple matched filter array and a multiple holographic lens which can employ the teachings of the present invention to first fabricate and then utilize the multiple holographic lens. An object of interest 40 is moving past the input to the optical correlator (or different objects entering the field of view), and is imaged by an input lens 42 onto a spatial light modulator (SLM) 44, which spatially modulates the image onto a laser beam from a laser 46, directed thereto by a mirror 48 and beam splitter 50. The spatially modulated laser beam is Fourier transformed and focused by a multiple holographic lens 52 and directed onto a corresponding array of matched filters 54.

The spatially modulated laser reconstruction beam is multiply focused by the multiple holographic lens 52, and the zero order reconstruction beam is also passed thereby, as in FIG. 3. A polarization rotator 56 then rotates the several beam components with different angles of polarization rotation, and a polarization filter 58 then substantially passes the focused beam and substantially blocks the zero order reconstruction beam, all in a manner as explained with reference to FIG. 3. An inverse Fourier transform lens array 60, which can comprise an array of either conventional or holographic lenses, Fourier transforms the output of the matched filters and directs the outputs thereof onto a detector array 62, the output signals of which are electronically processed at 64, to produce output control signals.

While several embodiments and variations of the present invention for an in-line holographic lens arrangement are described in detail herein, it should be apparent that the disclosure and teachings of the present invention will suggest many alternative designs to those skilled in the art.

What is claimed is:

1. An optical system for producing a focused beam of light, focused by an in-line holographic lens while substantially blocking or attenuating the zero order reconstruction beam illuminating and passed by the in-line holographic lens, comprising;
   a. an in-line holographic lens having a central optical axis and a symmetrically recorded fringe pattern;
   b. means for directing a reconstruction beam of light at said in-line holographic lens along said optical axis, such that the holographic lens produces a focused beam of light along said optical axis and also passes the zero order in-line reconstruction beam;
   c. a polarization rotator positioned along said optical axis to receive the light output of said in-line holographic lens, including the focused beam of light and the zero order reconstruction beam, with the focused beam of light being incident upon and traversing through the polarization rotator at different angles from the zero order reconstruction beam, such that substantial portions of the focused beam of light are rotated in polarization differently from said zero order reconstruction beam;
   d. a polarization filter positioned along said optical axis to receive the light output of said polarization rotator and having the polarization angle thereof positioned substantially at the polarization angles of the focused beam to substantially pass the focused beam of light and substantially attenuate the zero order reconstruction beam.

2. An optical system for producing a focused beam of light, focused by an in-line holographic lens while substantially blocking or attenuating the zero order reconstruction beam illuminating and passed by the in-line holographic lens, as claimed in claim 1, said in-line holographic lens comprising a recording of a regular symmetrical fringe pattern produced by illuminating a photo recording medium forming the holographic lens with a reference beam of light along the optical axis of the holographic lens formed thereby, and simultaneously illuminating said recording medium with an expanding beam of light with a spherical wavefront from a point source, which is expanding symmetrically about the collimated beam and also about the optical axis of the holographic lens formed thereby to produce a regular symmetrical fringe pattern thereon, such that when the holographic lens is illuminated with a reconstruction beam along the optical axis thereof, the lens reproduces a similar focused beam of light having a symmetrical distribution of light around the optical axis.

3. An optical system for producing a focused beam of light, focused by an in-line holographic lens while substantially blocking or attenuating the zero order reconstruction beam illuminating and passed by the in-line holographic lens, as claimed in claim 2, said point source being relatively close to the holographic lens during the production thereof, to illuminate the holographic lens with a rapidly expanding curved wavefront to produce a low f-number holographic lens, such that the angles of incidence of the focused beam of light on the polarization rotator are substantially different from the angle of incidence of the reference beam on the polarization detector.

4. An optical system for producing a focused beam of light, focused by an in-line holographic lens while substantially blocking or attenuating the zero order reconstruction beam illuminating and passed by the in-line holographic lens, as claimed in claim 1, said in-line holographic lens comprising a recording of a regular symmetrical fringe pattern produced by illuminating a photo recording medium forming the holographic lens with a reference beam of light along the optical axis of the holographic lens formed thereby, and simultaneously illuminating said recording medium with a converging beam of light with a spherical wavefront which is converging symmetrically about the collimated beam and also about the optical axis of the holographic lens formed thereby to produce a regular symmetrical fringe pattern thereon, such that when the holographic lens is illuminated with a reconstruction beam along the optical axis thereof, the lens reproduces a similar focused beam of light having a symmetrical distribution of light around the optical axis.

5. An optical system for producing a focused beam of light, focused by an in-line holographic lens while substantially blocking or attenuating the zero order reconstruction beam illuminating and passed by the in-line holographic lens, as claimed in claim 1, said in-line holographic lens being one lens of a multiple holographic lens element, said means for directing a reconstruction beam directs light to illuminate all of the holographic lenses of the multiple holographic lens, and said polarization rotator and polarization filter being positioned to receive the outputs from all of the holographic lenses of the multiple holographic lens element.

* * * * *